(12) United States Patent
Van Dyck

(10) Patent No.: US 6,707,941 B1
(45) Date of Patent: Mar. 16, 2004

(54) PATTERN RECOGNITION USING CONTEXTUAL CORRELATION

(76) Inventor: Dirk Ernest Maria Van Dyck, Kleine Grippe 37, B-2630 Aartselaar (BE)

( * ) Notice: Subject to any disclaimer, the term of this patent is extended or adjusted under 35 U.S.C. 154(b) by 0 days.

(21) Appl. No.: 09/445,158

(22) PCT Filed: May 20, 1998

(86) PCT No.: PCT/EP98/03166

§ 371 (c)(1),
(2), (4) Date: Mar. 6, 2000

(87) PCT Pub. No.: WO98/55959

PCT Pub. Date: Dec. 10, 1998

(30) Foreign Application Priority Data

Jun. 4, 1997 (BE) .............................. 9700482

(51) Int. Cl.$^7$ .............................. G06K 9/00; G06K 9/66; G06K 9/56
(52) U.S. Cl. ..................... 382/181; 382/195; 382/205
(58) Field of Search ................................ 382/181, 195, 382/205, 144, 145, 147

(56) References Cited

U.S. PATENT DOCUMENTS 5,046,120 A * 9/1991 Bishop ....................... 382/260

FOREIGN PATENT DOCUMENTS

EP        0455898        11/1991        ........... G06F/15/70

OTHER PUBLICATIONS

SPIE, vol. 657, Applications of Artificial Intelligence IV (1986), Apr. 15–16, 1986 pp. 104–108.

* cited by examiner

Primary Examiner—Kimberly Williams
Assistant Examiner—Tom Y. Lu
(74) Attorney, Agent, or Firm—Webb Ziesenheim Logsdon Orkin & Hanson, P.C.

(57) ABSTRACT

A method for reducing the quantity of digital information in a data set for the purpose of pattern recognition, comprising: a) determining digital a priori information values associated with at least one known pattern; b) determining digital information values of first elements associated with a pattern for recognition; c) pairing two or more first elements into second elements, wherein the number of digital information values for each second element is at least doubled; d) for each second element, on the basis of the digital a priori information values, merging a minimum of two digital information values into a reduced second element with a reduced number of digital information values.

6 Claims, 3 Drawing Sheets

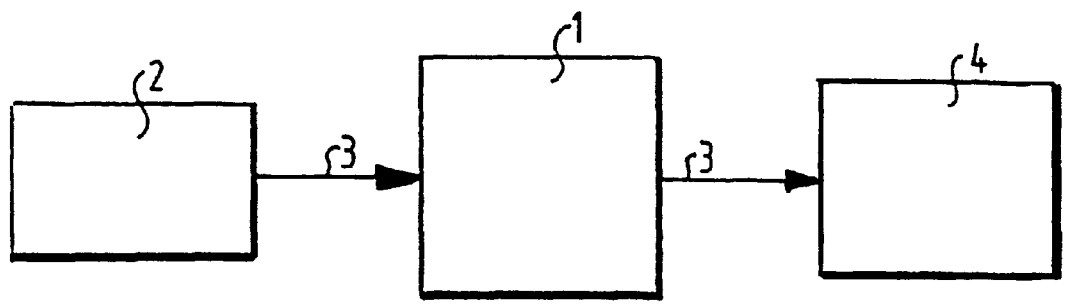
FIG.1
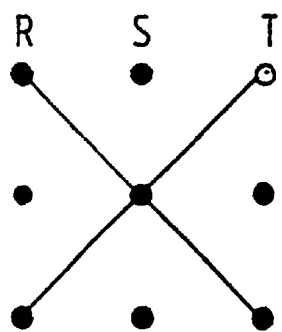
FIG.2
FIG.3

| R | S | → | V |
|---|---|---|---|
| 0 | 0 | → | 0 |
| 0 | 1 | → | 1 |
| 1 | 0 | → | 2 |
| 1 | 1 | → | 3 |

PATTERN RECOGNITION USING CONTEXTUAL CORRELATION

BACKGROUND OF THE INVENTION

1. Field of the Invention

The present invention provides a method for reducing, with a minimal loss of relevant information, the quantities of data in a data set from which a pattern of data must be recognized.

2. Description of the Prior Art

A data set can contain an array of elements such as pixels or picture elements in an image, each element of which can adopt a number of values, here called information values or codes. The importance of recognizing patterns in data sets is great. If the data set contains for instance pixels of a typed or handwritten text, the separate letters of this text can be recognized by pattern recognition. Even when noise is present in the image for recognition it is often still possible to recognize the original patterns. If the data set is for instance a medical photograph, cell abnormalities or cell tumours can be recognized at an early stage by pattern recognition.

In the prior art diverse methods are known for recognizing patterns in data sets. There are statistical methods which however cannot process very well the structural information in the links in complex patterns. There are for instance also descriptive methods, wherein the attempt is made to define the properties of the patterns for recognition. These methods result in problems when the patterns for recognition are complex. Use can also be made of neural networks to recognize patterns. However, the use of neural networks to recognize patterns in large data sets comes up against limitations in the capacity of the present computers with which the neural networks are computed.

SUMMARY OF THE INVENTION

The method according to the present invention extracts relevant information from the data set, based on the internal information content which is estimated from the statistical properties which are present in a training set of already known (a priori) patterns provided to the device of the invention during a training phase. Non-relevant or superfluous information is ignored according to the present method. The size of the data set is hereby reduced, wherein a minimal loss of relevant information occurs.

The present invention relates to a method and device for reducing the quantity of digital information in a data set for the purpose of pattern recognition. The method comprises the following steps of:
  determining during a training phase digital a priori information values associated with at least one known pattern. These a priori information values form a training set which is used in a later step in the recognition of patterns.
  determining digital information values of first elements associated with a pattern for recognition. The first elements can for instance be pixels of an image, in which image a pattern must be recognized. Digital information values are then for instance the grey tone values or colour values of the pixels.
  grouping two or more first elements;
  pairing the grouped first elements into second elements, wherein the number of digital information values for each second element is at least doubled;
  for each second element, on the basis of pattern information from the training set formed in the training phase, merging a minimum of two digital information values into a reduced second element with a reduced number of information values. The pattern information is calculated on the basis of a statistical estimate of the probability that the digital information value is associated with a particular pattern. This statistical estimate is calculated from the data of the training set.

The merging of information values referred to in the final step takes place in a manner such that as little pattern information as possible is lost. On the basis of the a priori known possible patterns, the best estimate can be calculated of the probability that a combination of a determined information value and a determined pattern occurs. On the basis of the calculated estimate of the probability of all possible combinations of information values and patterns, a decision criterion is formulated with which the combination of pattern and information value can be determined which yields a minimal loss of pattern information when merged.

BRIEF DESCRIPTION OF THE DRAWING

The present invention will be described hereinbelow with reference to a preferred embodiment. The embodiment is illustrated in figures, in which:

FIG. 1 is a schematic overview of the device according to the present invention;

FIG. 2 shows a part of an image of a pattern for recognition;

FIG. 3 shows lists of the number of times that a combination of pattern and pixel value occurs;

DETAILED DESCRIPTION OF THE PREFERRED EMBODIMENT

Figure 4:
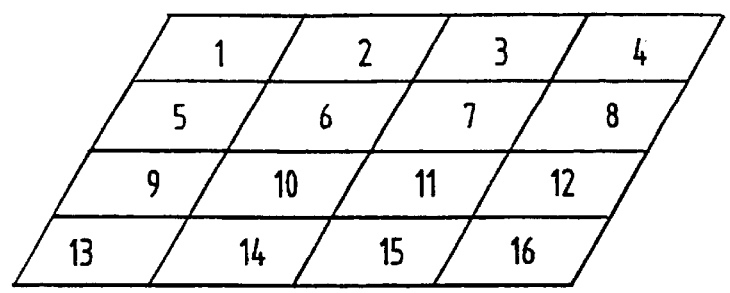
FIG. 4 shows schematically the merging of pixels.
Figure 4:
Figure 4:
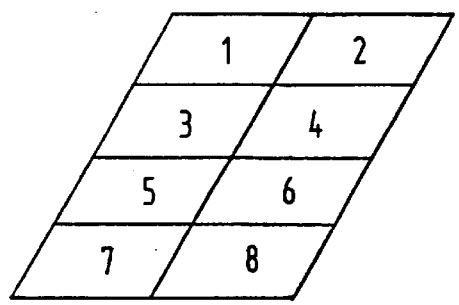
Figure 4:
Figure 4:
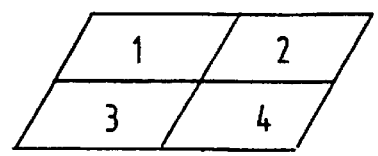
Figure 4:
Figure 4:
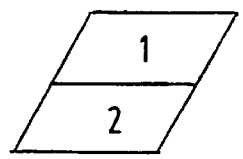
Figure 4:
Figure 4:
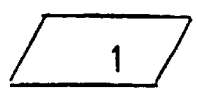

FIG. 1 shows a device according to the present invention. The device comprises inter alia:
  a computer 1 with which the methods according to the present invention to be explained below can be performed.
  input terminal 2 for input into the computer of digital information values; the input can take place using a keyboard. However, the input generally originates from an external electronic device such as pixels from a video camera, scanner and the like.
  connections 3 between the computer, input terminal 2 and output terminal 4 enabling data transfer therebetween.
  output terminal 4 for output of the results of the method according to the present invention.

FIG. 2 shows an example of an image consisting of nine pixels which can adopt a value "1" (=black) or a value "0" (=white). For the sake of simplicity a black-and-white image, therefore without grey tones or colours, is taken as starting point. In the figure three pixels are designated respectively R, S and T. Suppose that two patterns, i.e. "/" and "\", are to be recognized by the system. First of all, in the so-called training phase or preparatory phase the value of all pixels is determined, both when the pixels display the pattern "/" and when the pixels display the pattern "\". The results of the training phase form the training set, in which a list is compiled per pixel which contains all combinations of patterns α and values i of pixels.

FIG. 3 shows these lists for the three pixels R, S and T. On the basis of the lists the frequency is determined with which the combinations of pixel values and patterns for recognition occur in the relevant pixel of the training set.

In the example each pattern has the same combination of pixel values. This is generally not the case, however. In the recognition of letters for instance, it is very well possible that a determined letter has multiple variants, since letters can be represented in different ways. It is hereby possible for different combinations of pixel values to occur in the same pattern ("letter").Although a letter can have a plurality of representations, a large degree of mutual similarity is however present.

From the lists shown in FIG. 3 can be determined how often a combination of a particular pattern and a pixel value occurs. The number of times that such a combination occurs is designated with "$n^R_{i\alpha}$, wherein R represents the relevant pixel, i represents the digital pixel value and a represents the pattern in question. Table 1 shows for pixels R, S and T the corresponding values for $n_{i\alpha}$.

TABLE 1

Number of times that a combination of pattern and pixel value occurs.

|  | element R | element S | element T |
|---|---|---|---|
| $n_{0/}$ | 2 | 2 | 0 |
| $n_{1/}$ | 0 | 0 | 2 |
| $n_{0\backslash}$ | 0 | 2 | 2 |
| $n_{0/}$ | 2 | 0 | 0 |

For all pixels and all possible pixel values the probability $P_{i\alpha}$ is then calculated of these occurring in a particular pattern. The probability is calculated using the so-called Laplace Samplesize Corrector:

$$p_{i\alpha} = p_\alpha \frac{n_{i\alpha} + 1}{\sum_i (n_{i\alpha} + 1)}$$

Using the above expression table 2 shows for the three pixel R, S and T the probabilities per pixel value and pattern. The probabilities for the other pixels can be calculated in analogous manner.

TABLE 2

Probabilities per pixel value and pattern for pixels R, S and T.

|  | pixel R | pixel S | pixel T |
|---|---|---|---|
| $p_{0/}$ | 3/8 | 3/8 | 1/8 |
| $p_{1/}$ | 1/8 | 1/8 | 3/8 |
| $p_{0\backslash}$ | 1/8 | 3/8 | 3/8 |
| $p_{0/}$ | 3/8 | 1/8 | 1/8 |

The pixels are subsequently grouped into groups of two pixels. Since the correlation, between adjacent pixels is generally greater than between pixels far removed from each other, adjacent pixels are preferably grouped. A grouped pair of pixels is then combined into a new pixel. The total number of pixels is hereby halved. The quantity of possible pixel values is however doubled. No information is hereby lost. The grouping of pixels can otherwise take place in a number of different ways: for instance initially between pixels located on a horizontal line and subsequently between pixels located on a vertical line. In the example pixels R and S located on a horizontal line are paired.

FIG. 4 shows the process of pairing pixels. In this figure numbered parallelograms designate the pixels. At each step from the one layer to the other layer (i.e. after each pairing) the number of pixels halves, until in this case after pairing four times only one pixel remains.

Figures 5, 6:
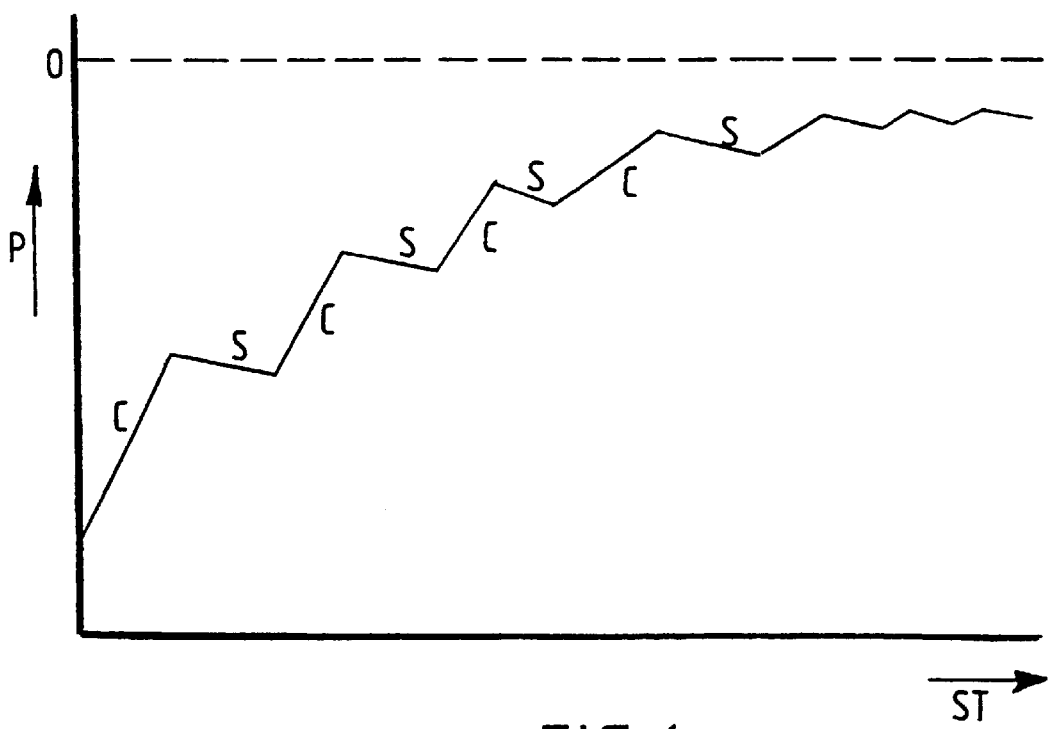
FIG. 5 illustrates the conversion of the coding of the information value after pairing.
FIG. 6 shows a graph which shows the progression of the total information as a function of the pairing and merging steps.

A new coding can be used for the possible combination of pixels. FIG. 5 gives a new coding for the different combinations of pixels R and S. The result of merging two pixels R and S is therefore in this case a single pixel V with pixel value 0, 1, 2 or 3. The probability $P_{ij\alpha}$ of pixel R having the pixel value i, pixel S having the pixel value j and the pattern being equal to α can be determined iteratively or can be approximated by the expression:

$$P_{ij\alpha} = \frac{P^R_{i\alpha} P^S_{j\alpha}}{P_\alpha}$$

Herewith and with the information from FIG. 3 the probabilities for each combination of new pixel values and patterns can be determined. Table 3 shows the results hereof.

TABLE 3

Probabilities per pixel value and pattern for pixel V

| pattern "/" | | pattern "\\" | |
|---|---|---|---|
| $p_{0/}$ | 9/32 | $p_{0/}$ | 3/32 |
| $p_{1/}$ | 3/32 | $p_{1/}$ | 1/32 |
| $p_{2/}$ | 3/32 | $p_{2/}$ | 9/32 |
| $p_{3/}$ | 1/32 | $p_{3/}$ | 3/32 |

The above procedure can be repeated, wherein the number of pixels is halved each time, while the number of pixel values is doubled.

Since the number of possible pixel values increases exponentially with the number of successive combinations of pairs of pixels, it may be necessary to reduce this number. This can be effected by merging pixel values to a new pixel value, also referred to as "pruning". Hereby the original pixel values can no longer be distinguished and it is inevitable that the information contained in the pixel values is lost. The number of pixel values has however decreased. In order to minimize the loss of information due to merging of pixel values, a criterion has been developed to decide which pixel values must preferably be merged.

Since the object of the present preferred embodiment of the invention is the recognition of patterns, the loss of information concerning the patterns due to merging of the pixel values must be minimal. Pattern information can be described as follows:

$$-\sum_i \sum_\alpha p_{i\alpha} \ln\left(\frac{p_{i\alpha}}{P_i}\right)$$

The loss of pattern information from merging of information values i and i' therefore amounts to:

$$-\left[\sum_\alpha p_{i\alpha}\ln\left(\frac{p_{i\alpha}}{P_i}\right)+\sum_\alpha p_{i'\alpha}\ln\left(\frac{p_{i'\alpha}}{p'_i}\right)-\sum_\alpha (p_{i\alpha}+p_{i'\alpha})\ln\left(\frac{p_{i\alpha}+p_{i'\alpha}}{P_i+p'_i}\right)\right]$$

This loss of information is determined for all combinations of pixel values i and i' for a particular pixel. In table 4 the information loss is determined for all combinations of pixel values of pixel V with reference to the example above.

TABLE 4

Loss of information for all possible combinations of pixel values

| Combination | Loss of information |
|---|---|
| 0 and 1 | $1.6653 \cdot 10^{-16}$ |
| 0 and 2 | −0.09811 |
| 0 and 3 | −0.004961 |
| 1 and 2 | −0.049619 |
| 1 and 3 | −0.032703 |
| 2 and 3 | $1.6653 \cdot 10^{-16}$ |

The pixel values of the combinations of information values with the smallest loss of information are chosen for merging. In this case the combination of 0 and 1 or the combination of 2 and 3, yields the smallest loss of information. When the combination 0 and 1 is chosen, each 0 therefore becomes a 1 or each 1 a 0. When the combination 2 and 3 is chosen, each 2 therefore becomes a 3 or each 3 a 2.

By merging the pixel values i and i' the probability of the merged pixel becomes $P_{i+i',\alpha}=P_{i\alpha}+P_{i'\alpha}$.

It is necessary to record in a code list or code book which pixel values have been merged so as to be able to use the information concerning the merging at a later stage during recognition of images. The method of merging pixel values must generally be performed for all pixels individually. The calculations above must therefore be performed for each pixel, wherein the results are stored per pixel in a code book.

If the number of pixel values is still too large after merging, the method can be repeated until the number of pixel values is sufficiently reduced. Thereafter the process of pairing pixels and possible merging of pixel values can recommence.

The methods of pairing pixels and merging pixel values can be repeated as often as necessary until all pixels are paired and the number of pixel values has been reduced to an acceptable level.

FIG. 6 shows a graph in which the total pattern information of an image is plotted against the steps of pairing pixels (designated with C) and merging or pruning (designated with S) of pixel values. At each step of pairing pixels the pattern information increases on account of the strong correlation between the pixels of the images for recognition. At each step of merging or pruning pixel values (a small quantity of) pattern information is lost. After having performed pairing and merging so often that the whole image is processed, the value of the pattern information converges to a value close to zero since recognition is practically perfect. The final value of the pattern information (i.e. the difference with a zero value) is the recognition error. This value is a cumulation of all information losses due to the merging of pixel values and due to an intrinsic ambiguity resulting from the limited statistical properties of the training set.

The pairing of pixels and merging of pixel values of the above described preferred embodiment can be repeated as often as necessary until an input suitable for neural networks results. The recognition of the patterns is then taken over by the neural network. The reason that neural networks cannot be applied directly on pixels (therefore without processing according to the above described method) is that the number of nodes of the neural network would become much too large to enable recognition in rapid manner of a pattern, given the present computer technology.

A pattern in an image can also be recognized directly by pairing pixels and merging pixel values. In the described preferred embodiment of the method and device only correlations in each layer between adjacent, closely situated elements are examined, correlations with remote elements takes place later in "deeper" layers. The data reduction according to the method forms a layered structure, wherein depending on the environment (context) elements are combined, or the pattern recognition is brought about using contextual correlation.

What is claimed is:

1. A method for reducing the quantity of digital information in a data set for the purpose of pattern recognition, said method comprising the steps of:
    (a) determining digital information values of first elements associated with a pattern for recognition;
    (b) pairing two or more first elements into second elements, wherein the number of digital information values for each second element is at least doubled; and
    (c) merging a minimum of two digital information values into a reduced second element with a reduced number of information values, wherein:
        the merging of information values of step (c) is based upon digital a priori information values which are determined from a trainable set of one or more already known a priori patterns provided during a training phase; and
        from the information values of at least one a priori known pattern a probability is determined that an information value of a pattern for recognition belongs to the a priori known pattern.

2. The method as claimed in claim 1, wherein the probability is determined by $$p_{i\alpha} = p_\alpha \frac{n_{i\alpha}+1}{\sum_i (n_{i\alpha}+1)}$$

wherein $n_{i\alpha}$ is the number of times a pairing of information value i and a known pattern $\alpha$ occurs, $p_{i\alpha}$ is the probability that a pairing of information value i and a known pattern $\alpha$ occurs and $p_\alpha$ is the summation over all information values of probabilities $p_{i\alpha}$.

3. The method as claimed in claim 2, wherein a pattern information value is calculated by $$-\sum_i \sum_\alpha p_{i\alpha}\ln(p_{i\alpha}/p_i)$$

wherein $p_{i\alpha}$ is the probability that a pairing of information value i and a known pattern $\alpha$ occurs and $p_i$ is the probability that an information value occurs.

4. The method as claimed in claim 3, wherein the difference in pattern information value before and after merging of information values is determined for all pairings of information values.

5. A method for reducing the quantity of digital information in a data set for the purpose of pattern recognition, said method comprising the steps of:

(a) determining digital information values of first elements associated with a pattern for recognition;

(b) pairing two or more first elements into second elements, wherein the number of digital information values for each second element is at least doubled; and (c) merging a minimum of two digital information values into a reduced second element with a reduced number of information values, wherein:

the merging of information values of step (c) is based upon digital a priori information values which are determined from a trainable set of one or more already known a priori patterns provided during a training phase; and in step (c) the digital information values are merged which yield a minimal loss in pattern information value.

6. A method for reducing the quantity of digital information in a data set for the purpose of pattern recognition, said method comprising the steps of:

(a) determining digital information values of first elements associated with a pattern for recognition;

(b) pairing two or more first elements into second elements, wherein the number of digital information values for each second element is at least doubled; and (c) merging a minimum of two digital information values into a reduced second element with a reduced number of information values, wherein:

the merging of information values of step (c) is based upon digital a priori information values which are determined from a trainable set of one or more already known a priori patterns provided during a training phase; and the digital information values of second elements are used as input values for a neural network.

* * * * *